Figure 1:
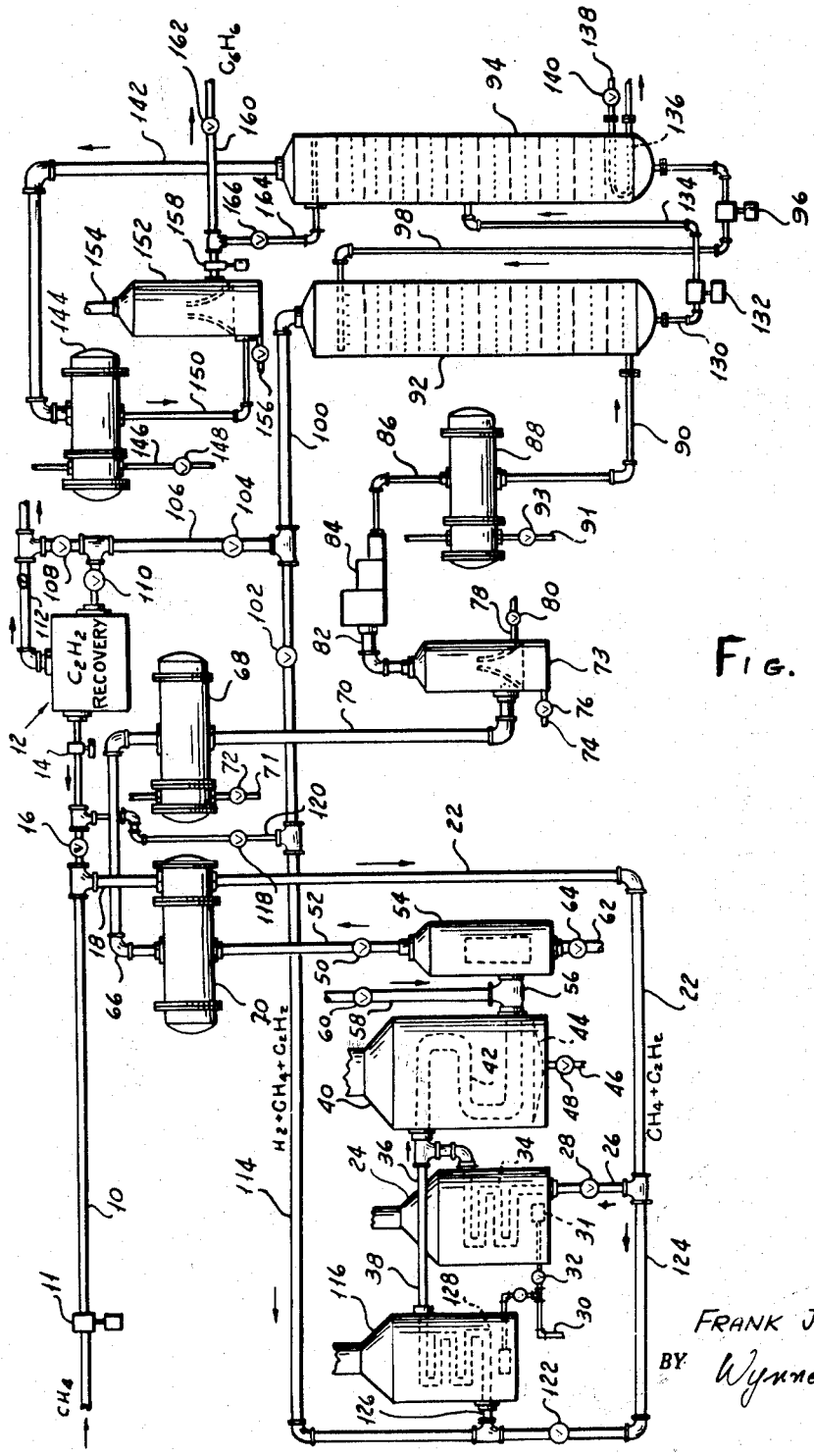

March 30, 1965 F. J. JENNY 3,176,045
METHOD OF SYNTHESIZING AROMATIC HYDROCARBONS
Filed April 29, 1960 2 Sheets-Sheet 1

INVENTOR.
FRANK J. JENNY
BY Wynne + Finken
ATTORNEYS

March 30, 1965 F. J. JENNY 3,176,045
METHOD OF SYNTHESIZING AROMATIC HYDROCARBONS
Filed April 29, 1960 2 Sheets-Sheet 2

INVENTOR.
FRANK J. JENNY
BY
*Wynne & Finken*
ATTORNEYS.

United States Patent Office 3,176,045
Patented Mar. 30, 1965

3,176,045
METHOD OF SYNTHESIZING AROMATIC HYDROCARBONS
Frank J. Jenny, 460 W. 24th St., New York, N.Y.
Filed Apr. 29, 1960, Ser. No. 25,680
1 Claim. (Cl. 260—673)

My invention relates to a method of synthesizing aromatic hydrocarbons and more particularly to an improved method of producing benzene from methane.

This application is a continuation-in-part of my co-pending application, Serial No. 462,271, filed October 14, 1954, now abandoned.

Natural gas is composed principally of methane and is currently largely used as a fuel. There has long been an extensive theoretical and economic interest in the conversion of methane in general, and natural gas in particular, into more valuable hydrocarbons. One method of increasing the value of natural gas is its conversion to synthesis gas, that is, to a mixture of carbon monoxide and hydrogen.

The synthesis gas can then be converted to liquid hydrocarbons and oxygenated chemical compounds by the Fischer-Tropsch and related synthesis processes. Other methods of enhancing the value of methane are known to the art, such as those in which hydrocarbons are reacted with halogens for which hydrocarbons have a special affinity.

It has long been known that methane can be decomposed at high temperatures, and that under certain conditions some benzene and acetylene will be obtained.

Benzene is a highly important chemical building block. For example, benzene may be reacted with ethylene to form ethylbenzene which may then be dehydrogenated to styrene. Styrene is an extremely valuable compound for the making of plastics, either in the form of polystyrene or other copolymers. Benzene is also widely used in the manufacture of phenol, aniline, nylon, synthetic detergents, and other like essential materials.

In the decomposition of methane, there are four competing reactions:

(1) $6CH_4 = C_6H_6 + 9H_2 - 226,734$ B.t.u.
(2) $6CH_4 = 3C_2H_2 + 9H_2 - 483,822$ B.t.u.
(3) $6CH_4 = 6C + 12H_2 - 187,728$ B.t.u.
(4) $3C_2H_2 = C_6H_6 + 257,088$ B.t.u.

It will be observed that the desired reaction is expressed in Equation 1 and that Equations 2 and 3 represent incidental competing side reactions which cannot be completely avoided.

Equation 4 represents a secondary reaction which takes place following the formation of acetylene in accordance with Equation 2.

This polymerizing reaction is exothermic while the cracking reactions of Equations 1, 2 and 3 are endothermic requiring a large quantity of heat which must be supplied at a high temperature level in order that the reactions may occur.

It is well known that at high temperatures all hydrocarbons have a strong tendency to revert to their elemental components of carbon and hydrogen, that is to say, there is a strong tendency for the reaction of Equation 3 to occur at high temperatures. In order to reduce the occurrence of competing reaction of Equation 3 and foster the occurrence of the desired reaction of Equation 1, critical conditions of time, temperature and other process conditions must be carefully maintained in accordance with my invention, as will be hereinafter more fully pointed out.

It is known to the art that cracking or decomposition of some hydrocarbons will occur at comparatively low temperature levels in the vicinity of 700° F. These comparatively easily cracked hydrocarbons are the higher molecular weight hydrocarbons. Cracking temperatures progressively increase as a function of a reduction in the molecular weight of the hydrocarbons. Stated differently, the lower molecular weight hydrocarbons are more refractory than are higher molecular weight hydrocarbons and hence are cracked with greater difficulty. Methane, which is the principal component of natural gas, has well-known cracking characteristics. From basic thermodynamic considerations, methane is, until critical high temperatures are reached, the most stable hydrocarbon. It is not until these comparatively high critical temperature levels are reached that it will decompose. Temperatures of at least 1800° F. are required before methane may be decomposed and reconverted into benzene following such decomposition without the use of a catalyst. In the vicinity of 1800° F., the rate of thermal decomposition of methane to carbon and hydrogen is very high. Equilibrium relationships, furthermore, favor the formation of heavy tarry materials which are polymerization products and which represent an economic loss and reduce the length of time the process may run without shutting down for cleaning the apparatus used to practice the process. It will be seen, therefore, that a successful process must be such as to reduce the formation of a free carbon and heavy tarry materials.

Any practical process for converting methane to aromatic hydrocarbons, furthermore, must be such that the yield of benzene is of sufficient magnitude that a profit will be produced, taking into consideration the cost of the raw materials, the cost of the plant, and the cost of the operation of the process. At the present-day labor and material costs, the cost of natural gas and the market price range for benzene, a practical process must produce at least one gallon of benzene per thousand standard cubic feet of natural gas charged. A higher yield than this clearly is desirable. Any new process for producing benzene must compete with the other known processes for its production, such as its recovery from coke oven operations and its formation in catalytic refining processes employing naphthenic components found in light naphtha fractions.

Another suggested method for obtaining benzene from natural gas is described in U.S. Patent to Robinson, No. 2,608,594, which employs a two-stage process and operates on controlling process conditions to produce acetylene in a first stage followed by the polymerization of acetylene thus formed, in a secondary subsequent stage. It will readily be appreciated by reference to Equations 1 and 2 above that the formation of acetylene requires more than twice the heat necessary in forming benzene directly. Then, too, the temperature of reaction is higher in the formation of acetylene than it is in the direct formation of benzene. Besides this, a two-stage process is much more complicated and requires a higher investment in plant.

One object of my invention is to provide a process for converting hydrocarbons into aromatic hydrocarbons such as benzene in a simple, convenient, expeditious, economic and efficient manner.

Another object of my invention is to provide a method of converting methane into benzene in a single-stage process.

Another object of my invention is to provide a method of converting methane into benzene in which the desired reaction is fostered and competing undesirable side reactions are reduced.

Another object of my invention is to provide a method of converting methane into benzene which will produce a high yield of the desired product with good thermal efficiency.

Another object is to provide a method of converting hydrocarbons into aromatics in a two-stage catalytic process.

Other and further objects of my invention will appear from the following description.

Figure 2:
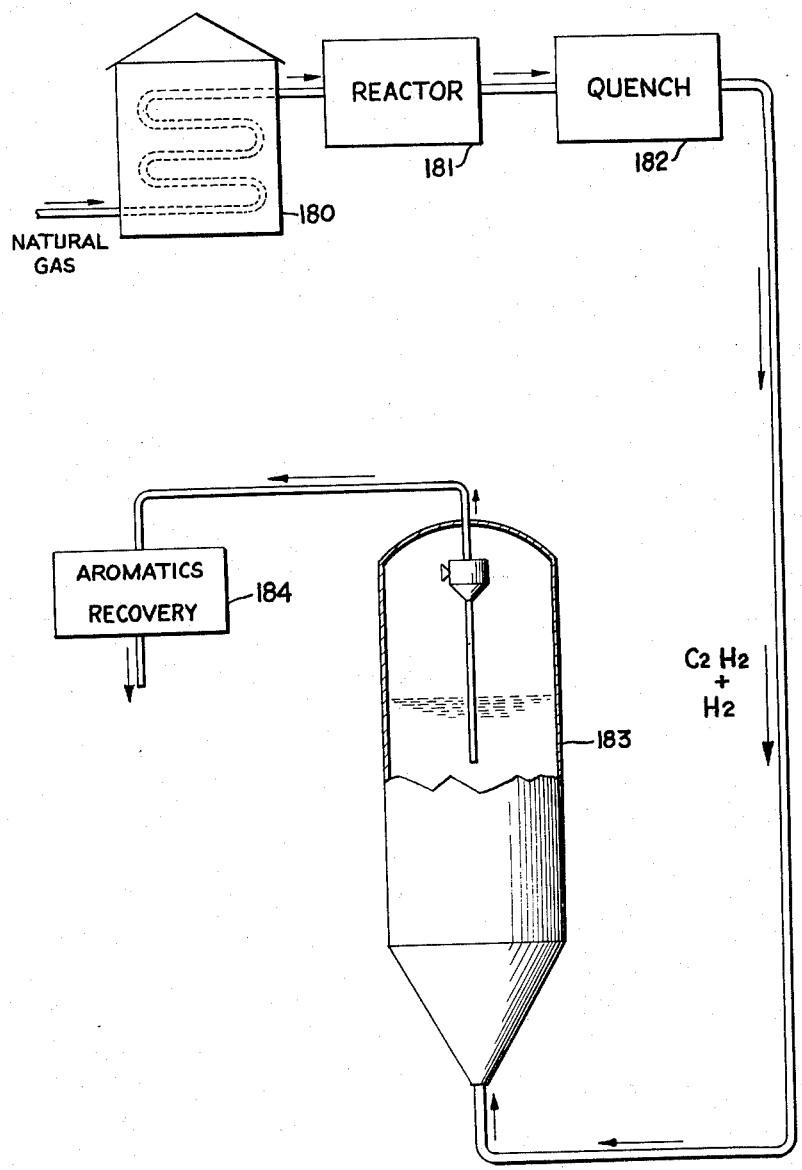

In the accompanying drawings which form part of the instant specification and which are to be read in conjunction therewith;

FIGURE 1 is a diagrammatic view showing one form of the apparatus capable of carrying out the process of my invention; and FIGURE 2 is a schematic flow diagram of my two-stage catalytic process for the preparation of aromatic hydrocarbons.

In general, my invention contemplates the separation of acetylene from the effluent process gases and recycling of acetylene to the reaction zone. In this manner, the law of mass action is availed of to force equilibrium in the direction of Equation 4 and away from the reaction of Equation 2. Stated differently, we learn from the postulates of Guldberg and Waage that an excess of acetylene will reduce the rate of reaction of Equation 2. This in turn increases the velocity of the desired reaction of Equation 1. Then, too, I control the temperature of reaction within a comparatively narrow critical range between 1800° F. and 2450° F., at which temperatures the production of benzol is at an optimum. Higher temperatures favor the increase in the rate of the formation of acetylene. Besides this, the reaction time is kept between .001 second and 5.0 seconds in order to reduce the occurrence of the competing reaction of Equation 3 and its concomitant formation of carbon. Then too, I recycle hydrogen with the gas being charged to the process. This excess of hydrogen aids in reducing the occurrence of Equation 2 along with the recycling of acetylene. The presence of an excess of hydrogen, furthermore, prevents the overpolymerization of the aromatic hydrocarbons to substances of reduced commercial value. Another important feature of my invention is the limiting of the conversion per pass through the single reaction stage to between 15 percent and 45 percent in order to minimize the formation of carbon, that is, the occurrence of the reaction of Equation 3. The pressure at which the desired reaction takes place is not critical. In general, increased pressures reduce the occurrence of the reaction of Equation 2, but appear to have little direct effect on the formation of benzol, that is, upon the occurrence of the desired reaction of Equation 1. It will be understood that increased pressures make for smaller physical sizes of equipment for the same volume of throughput. Increased pressures, however, and accompanying high temperatures introduce construction problems. Each plant may be designed for an optimum pressure balancing of the cost of the size of the equipment against its ruggedness and ability to withstand increased pressures. It is to be noted, further, that in my process the critical reaction time may be controlled by quenching the effluent products as they leave the reaction zone to reduce their temperature to below 1800° F. rapidly. It is to be noted that owing to the endothermic nature of the principal reaction the process tends to be self-quenching and under certain conditions external quenching need not be employed. Any appropriate cooling medium may be used to perform the quenching step. In practice, steam may be advantageously employed as will be pointed out more fully hereinafter. In my process, it will be noted that the conditions are such as to favor the polymerization of acetylene to the desired benzene. The polymerization reaction is highly exothermic providing a portion of the heat required for the highly endothermic reaction of Equation 1. My process is such, therefore, as to effect a substantial heat economy and a reduction of the net heat which would otherwise have to be supplied from external sources.

My two-stage catalytic process is accomplished by converting methane or other hydrocarbon to acetylene and hydrogen in a first reaction zone, quenching the reaction product to a temperature below 1800° F., passing the quenched products to a catalytic vapor phase reaction zone to convert acetylene to aromatics, and recovering therefrom aromatic hydrocarbons. The acetylene conversion step is preferably performed in a dense phase fluidized catalytic bed at superatmospheric pressure at a temperature of about 450° F. to about 950° F. The catalyst is a metal or metal oxide of Group VI or Group VIII metals.

More particularly referring now to FIGURE 1, natural gas, whose principal constituent is methane, is pumped from a suitable supply (not shown) through pipe 10 by compressor 11. The natural gas may contain minor amounts of ethane and propane. It will be understood that other hydrocarbons may also be converted in my process, as known in the art of acetylene chemistry for the conversion to acetylene. Acetylene from acetylene recovery apparatus of any appropriate type known to the art and indicated generally by the reference numeral 12, is pumped by compressor 14 past valve 16 for admixture with the charged gas in pipe 18. The rate of charge of acetylene for admixture with methane may be such that at least two percent of acetylene by volume is present in the charge. The mixture comprising essentially methane and acetylene in pipe 18 may advantageously be preheated by heat exchange with effluent hot products of reaction in heat exchanger 20. It is to be understood, of course, that if desired all or part of the gases being charged may be by-passed around the heat exchanger 20 by a suitable by-pass pipe (not shown). The preheated charging stock enriched with acetylene leaves the heat exchanger 20 through pipe 22. All or a portion of the charging stock may be introduced into a charging stock preheater furnace 24 through pipe 26 under the control of valve 28. Furnace 24 is provided with burners 31 which are supplied with fuel through a pipe 30 under the control of valve 32. The charged gases are heated in a pipe coil 34 so that they will leave the furnace 24 for passage into pipe 36 at a temperature of not substantially more than 1800° F. The preheated gases are mixed with preheated recycled gases coming from pipe 38 as will be described more fully hereafter. The preheated gases flow to the reactor 40 which is provided with a reaction tube 42 adapted to be heated by burner 44, which is supplied with fuel from pipe 46 under the control of valve 48. It is to be understood any appropriate heating means or method may be employed to supply heat to the reaction zone. In the reactor 40 the gases are maintained at a temperature of between 1800° F. and 2450° F. The heating conditions in the reactor will be dictated by the quantity of acetylene which is present in the charge. Large quantities of acetylene in the charge will result in a higher degree of occurrence of the exothermic reaction of Equation 4. This will reduce the quantity of heat required to supply the endothermic reactions. Small quantities of acetylene in the charged gases will require a greater rate of heat transfer, that is, a higher firing rate in the reaction zone. It will also be observed by those skilled in the art that the formation of acetylene is affected by the presence of acetylene in the reaction zone. When there are small quantities of acetylene present in the charged gases, a higher yield of acetylene is obtained. This high yield is separated in the acetylene recovery step and recycled. The recycling of acetylene reduces the rate of formation of acetylene. After the process has been on stream for a period, process conditions can be readily stabilized. The rate of flow of gases through the process can be controlled by means of valve 50 positioned in the pipe 52 which leads the hot, quenched, effluent products from the separator 54. Stated differently, the space velocity of the hot gases through the reaction zone, that is, the reaction time, can be controlled so that the reaction time will vary between .001 second and 5.0 seconds. Preferably, I control the process so that the reaction time will fall between 0.1 second and 4.0 seconds. With higher reaction times, there is a marked tendency towards occurence of the reaction of Equation 3, that is, there is a tendency toward carbon formation. A reaction time which is too short results in a low yield. In general, the optimum process conditions lie in operation at higher temperatures with shorter periods of time. For example, a highly preferred process condition would involve a reaction time of 0.1 second with the temperature of 2300° F. If temperatures in the vicinity of 2450° F. are exceeded, no worthwhile production of benzene will be achieved, though there will be considerable formation of acetylene and carbon. If acetylene is not recycled as shown in my process, there will be an increased formation of acetylene with a greatly reduced benzene formation.

In order to prevent the excessive formation of carbon, and overpolymerization of acetylene into heavy tarry products, that is, to prevent the reaction time from proceeding beyond the desired time period, I quench the products leaving the reaction zone in quenching zone 56 by introducing steam into intimate admixture with the hot products of reaction through pipe 58 under the control of valve 60. It is to be understood, of course, that any appropriate quenching medium may be employed. Steam may be advantageously used owing to its high specific heat. The rate of flow of steam into the quenching zone for admixture with the hot products of reaction is such that the temperature will be reduced to below 1800° F.

The quenched products are introduced into a separator 54 which may be of cyclone type adapted to remove solids such as asphaltic materials and carbon. These solids flow from the separator through pipe 62 under the control of valve 64. The hot, quenched, effluent gases from the separator leave through pipe 52 and pass through heat exchanger 20 and give up some of their heat to the incoming charging stock. The products of reaction leave the heat exchanger 20 through pipe 66 and pass through condenser 68 which is supplied with a cooling medium through pipe 71 under the control of valve 72. The effluent gases from the condenser will include the desired benzene, heavy polymers such as tar, water from the condensed quenching steam, unreacted methane, acetylene formed in the process, some ethylene formed in the process, and hydrogen. The cooled products pass from the condenser 68 through pipe 70 to a separator 73. The water is removed through pipe 74 under the control of valve 76. The heavy tarry products are removed from the separator through pipe 78 under the control of valve 80. The rate of flow of the cooling water through the heat exchanger 68 is so controlled that the steam will condense, but the desired benzene and lighter products will remain in the form of gases. Accordingly, the desired benzene, the ethylene, the acetylene, the unreacted methane and the hydrogen will leave the separator through pipe 82 by which they are passed to a compressor 84 in which the remaining reaction products are compressed to pressures between 50 pounds and 500 pounds per square inch. The component products pass through pipe 86 through cooler 88 which is supplied with the cooling medium through pipe 91 under the control of valve 93. The cooled compressed products are withdrawn from the cooler 88 through pipe 90 and passed to the bottom of absorber 92. A lean menstruum or absorption medium, such as an appropriate hydrocarbon oil, is pumped from the bottom of stripping tower 94 by pump 96 and supplied to the top of the absorber through pipe 98. The lean menstruum flows downwardly, countercurrent to the rising cooled compressed products introduced into the bottom of the absorber. The benzene is absorbed in the menstruum and enriches it. The unabsorbed gases leave the top of the absorption tower 92 through a pipe 100. These gases are largely hydrogen, unreacted methane, together with some acetylene and ethylene. By closing valve 102 and opening valve 104, all of these gases will be directed through pipe 106. By closing valve 108 and opening valve 110, all of the gases will be directed to the acetylene recovery apparatus 12. The unreacted methane and hydrogen are removed from the acetylene recovery zone 12 through pipe 112 and are passed to the atmosphere or used as fuel. The acetylene is withdrawn from the acetylene recovery apparatus 12 by pump 14, as described above, and used to enrich the fresh gases being charged to the process. Normally, however, valve 102 will be partially opened so that a portion of the gases removed from the top of the absorber 92 through pipe 100 may be recycled through pipe 114 to a recycle heating furnace 116. This ensures the presence of hydrogen in the reaction zone. Preferably the concentration of hydrogen may at least be 25 percent by volume at the entry into the reaction zone.

In order that the recycled gases can be enriched with acetylene in accordance with my invention, I open the valve 118 to permit the flow of acetylene from the acetylene recovery operation 12 through pipe 120 for introduction into pipe 114. The recycled gases, furthermore, may be admixed with a portion of fresh gaseous mixture being charged to the process. This is done by opening valve 122 to permit a portion of the gases being charged to the preheating furnace 24 to pass through pipe 124 into pipe 126 which also communicates with pipe 114. The recycled gases will comprise unreacted methane, hydrogen, and acetylene. If desired, valve 28 may be closed and valve 122 completely opened so that the charging stock and the recycled stock may be admixed and preheated in coil 128 of preheating furnace 116. It is to be understood, of course, that the preheated gases pass into pipe 38 from the preheating coil 128 at a temperature in the vicinity of 1800° F.

The enriched menstruum is withdrawn from the bottom of the absorption tower 92 through pipe 130 and pumped by pump 132 through pipe 134 for introduction into the stripping tower 94. The bottom of the stripping tower is provided with a heating coil 136 which is supplied with a heating medium, such as steam, through pipe 138 under the control of valve 140. In the stripping tower 94, the benzene and heavier hydrocarbons are boiled from the absorption medium and pass overhead through pipe 142 to a condenser 144 which is supplied with a cooling medium through pipe 146 under the control of valve 148. The condensate, which is chiefly benzene, is removed from the condenser 144 through pipe 150 and passed to a separator 152. Gases may pass from the separator through vent pipe 154. Bottom settlings and water are removed from the separator through pipe 156. The desired benzene is pumped by pump 158 through pipe 160 past valve 162 to any appropriate storage tank (not shown). The reflux condensate is taken from pipe 160 by pipe 164 under the control of valve 166 and passed to the top of the stripping tower 94.

It is further anticipated, as a separate consideration of my invention, to convert acetylene to benzene in the presence of an appropriate catalyst. The catalytic conversion is substantially complete at preferred temperature ranges from 450° F. to about 950° F. When applied, the polymerization step may be carried out in an apparatus according to my prior invention, U.S. Patent No. 2,852,545, issued September 16, 1958, using a dense phase fluidized reaction bed. A suitable catalyst is an oxide of a Group VI metal on a silica-alumina support.

When adopting this polymerization step, since the conversion of acetylene may be substantially complete, the the use of recycle acetylene to the thermal conversion step may not be practical depending on economic considerations. This is a factor which is determined separately in each specific instance for commercial application.

The temperature in the first stage of conversion to acetylene is preferably in the range of 1900° F. to about 2300° F. The pressure in the second stage acetylene polymerization zone is preferably at substantially the same pressure level occurring in the first stage.

Referring now to the schematic system of FIGURE 2, natural gas or other hydrocarbon is preheated at 180 and delivered to reactor 181 where the gas is cracked to acetylene and hydrogen. The product gases are quenched at 182, preferably with steam and passed to catalytic reactor 183, which is preferably a dense phase fluidized catalytic reactor. The desired aromatics are recovered at 184 in conventional manner.

In a preferred embodiment of my process, natural gas is converted to acetylene. The reaction occurs at a temperature of about 2700° F. and superatmospheric pressure of about five atmospheres. A portion of the natural gas is converted to combustion gas in order to attain the high temperature of the reaction in an autothermic process. The yield of acetylene is approximately 30 percent based on total methane to the process.

The products of the high temperature reaction, including substantial volumes of hydrogen, are instantaneously quenched to a temperature of about 1000° F. The reaction time is less than about 0.5 second. The gas used for quench is a recycle gas as will be set forth.

The quenched gaseous stream is then passed to a dense phase fluidized reaction bed which is provided with internal heat exchange tubes in order to control the temperature of the reaction within a narrow temperature range as determined by the activity of the specific catalyst employed in the fluidized bed. In the heat exchange tubes, the net overall heat of reaction serves to generate high pressure process steam which is used to advantage in various phases of the process such as a source of power and in supplying heat for fractionation.

Because of the highly exothermic nature of the process, a fluidized bed is the most efficient means for removing the heat of reaction and for maintaining close temperature control to insure maximum catalyst activity. Fixed bed type operations are generally inefficient. With fixed beds, heat transfer rates are extremely low, resulting in undesired temperature gradients, with localized tar formation which condenses on the catalyst and thus impairs its activity.

The catalyst used in the fluidized bed is a metal or metal oxide of Group VI or Group VIII of the Periodic Table. In the preferred embodiment, the catalyst is a promoted iron-iron oxide catalyst operating at a temperature of about 500° F. and a vapor space velocity of about 500 standard cubic feet per hour per cubic foot of catalyst volume.

The reactor effluent is cooled by suitable heat exchange to atmospheric temperature. A liquid product is condensed and separated from the unconverted vapors. This liquid product contains the major portion of the aromatics produced. A further recovery of aromatics is effected by suitable scrubbing of the unconverted gases using conventional procedures.

A portion of the cooled unconverted gas is then compressed and recycled as the gas being used for quenching the high temperature reaction, as previously disclosed.

It will be seen that I have accomplished the objects of my invention. I have provided an improved process for converting methane into aromatic hydrocarbons in a simple, convenient, expeditious, economic, and efficient process. My process is a single-stage process in which I limit the conversion per pass to between 15 percent and 45 percent by keeping the reaction time between .001 second and 5.0 seconds. The limiting of the conversion per pass to between 15 percent and 45 percent minimizes the formation of carbon. The use of a single-stage process, furthermore, enables me to practice my process with less expensive and simpler apparatus. The enriching of the charging stock with acetylene increases the yield of the desired benzene. The addition of hydrogen to the charging stock minimizes the overpolymerization of acetylene to heavy tarry polymers. I control the temperature of my process to favor the formation of the desired benzene. I prevent the reaction from proceeding too far, that is, of the occurrence of a longer time of reaction than desired through the reaction proceeding outside the reaction zone, by quenching the reaction with steam. My process is such as to effect a substantial heat economy by utilizing the exothermic reaction of the polymerization along with the endothermic reaction of the decomposition of methane. By means of my process, I can charge natural gas comprising largely methane and obtain large yields of desired benzene.

It will be understood that certain features and subcombinations are of utility and may be employed without reference to other features and subcombinations. This is contemplated by and is within the scope of my claim. It is further obvious that various changes may be made in details within the scope of my claim without departing from the spirit of my invention. It is, therefore, to be understood that my invention is not to be limited to the specific details shown and described.

I claim:

In a method for converting a gas containing acetylene to liquid aromatic hydrocarbons, the improvement of converting said acetylene in a vapor phase reaction in a dense phase fluidized reaction bed at superatmospheric pressure and at a temperature in the range of about 450° F. to about 950° F. with a catalyst selected from the group consisting of metals and metal oxides of Group VI and Group VIII metals, at a space velocity in excess of about 250 standard v./hr./v., cooling the products of said reaction, and recovering said liquid aromatic hydrocarbons.

References Cited in the file of this patent

UNITED STATES PATENTS

| | | |
|---|---|---|
| 2,467,551 | Gorin et al. | Apr. 19, 1949 |
| 2,608,594 | Robinson | Aug. 26, 1952 |
| 2,813,138 | MacQueen | Nov. 12, 1957 |
| 2,875,148 | Scofield | Feb. 24, 1959 |